(12) United States Patent
Bekenn

(10) Patent No.: US 6,192,379 B1
(45) Date of Patent: Feb. 20, 2001

(54) DATA MODEL COMPILER SELECTIVELY USING A REFERENCE STORE OF LABELLED PROGRAM COMPONENTS WITHIN A COMMON CLASS

(75) Inventor: William J. F. Bekenn, Ipswich (GB)

(73) Assignee: British Telecommunications public limited company, London (GB)

( * ) Notice: Under 35 U.S.C. 154(b), the term of this patent shall be extended for 0 days.

(21) Appl. No.: 09/104,976

(22) Filed: Jun. 26, 1998

(30) Foreign Application Priority Data

Jun. 27, 1997 (GB) .................................................. 9713719

(51) Int. Cl.[7] ...................................................... G06F 3/00
(52) U.S. Cl. .................................................... 707/503
(58) Field of Search .................................. 707/503, 504, 707/509; 395/701

(56) References Cited

U.S. PATENT DOCUMENTS

| | | | |
|---|---|---|---|
| 5,303,146 | * 4/1994 | Ammirato et al. | 707/503 |
| 5,309,296 | * 5/1994 | Grandall et al. | 345/348 |
| 5,603,021 | * 2/1997 | Spencer et al. | 707/4 |
| 5,604,854 | * 2/1997 | Glassey | 707/503 |
| 5,633,998 | * 5/1997 | Schlafly | 714/1 |
| 5,634,124 | * 5/1997 | Khoyi et al. | 707/103 |
| 5,883,623 | * 3/1999 | Cseri | 345/335 |

\* cited by examiner

*Primary Examiner*—Stephen S. Hong
(74) *Attorney, Agent, or Firm*—Nixon & Vanderhye P.C.

(57) ABSTRACT

A computer system is provided to assist in the compilation and execution of data models which include an inter-linked assembly of pre-defined program components copied from a reference store and stored in a store. The computer system, including a data processor memory, having a control program stored therein, a store and input and output interfaces, respectively, is arranged, in operation, to compare fields of program components stored in the store with corresponding fields of pre-defined components stored in the reference store and to identify those fields shown by the comparison to be different. In particular, the computer system is arranged to automatically update a filed in the store, shown by the comparison to be different, with the contents of the corresponding filed in the pre-defined component stored in the reference store.

9 Claims, 7 Drawing Sheets

COLUMN

| | A | B | C | D | E |
|---|---|---|---|---|---|
| 1 | PIECE IDENTIFIER | | VERSION | SPECIFIC PIECE NAME | |
| 2 | | | i | Names of output rows of other pieces in the model forming inputs to this piece | |
| 3 | | | i | | |
| 4 | | | i | | |
| 5 | | | p | Parameters of this "Piece", e.g. dimensions, planning rules, costs | Copies of parameters for each data column. May be different for each column |
| 6 | DESCRIPTIVE TEXT FOR EACH ROW | | p | | |
| 7 | | | p | | |
| 8 | | | p | | |
| 9 | | | w | | Working calculations for intermediate variables |
| 10 | | | w | | |
| 11 | | | o | Unique names identifying each output row | Calculations forming the output values, the main formulae of the "piece" |
| 12 | | | o | | |
| 13 | | | o | | |

ROW

| | A | B | C | D | E |
|---|---|---|---|---|---|
| 1 | PIECE IDENTIFIER | VERSION | SPECIFIC PIECE NAME | | |
| 2 | | i | Names of output rows of other pieces in the model forming inputs to this piece | | |
| 3 | | i | | | |
| 4 | | i | | | |
| 5 | | p | Parameters of this "Piece", e.g. dimensions, planning rules, costs | Copies of parameters for each data column. May be different for each column | |
| 6 | DESCRIPTIVE TEXT FOR EACH ROW | p | | | |
| 7 | | p | | | |
| 8 | | p | | | |
| 9 | | w | | Working calculations for intermediate variables | |
| 10 | | w | | | |
| 11 | | o | Unique names identifying each output row | Calculations forming the output values, the main formulae of the "piece" | |
| 12 | | o | | | |
| 13 | | o | | | |

COLUMN

ROW

Figure 1

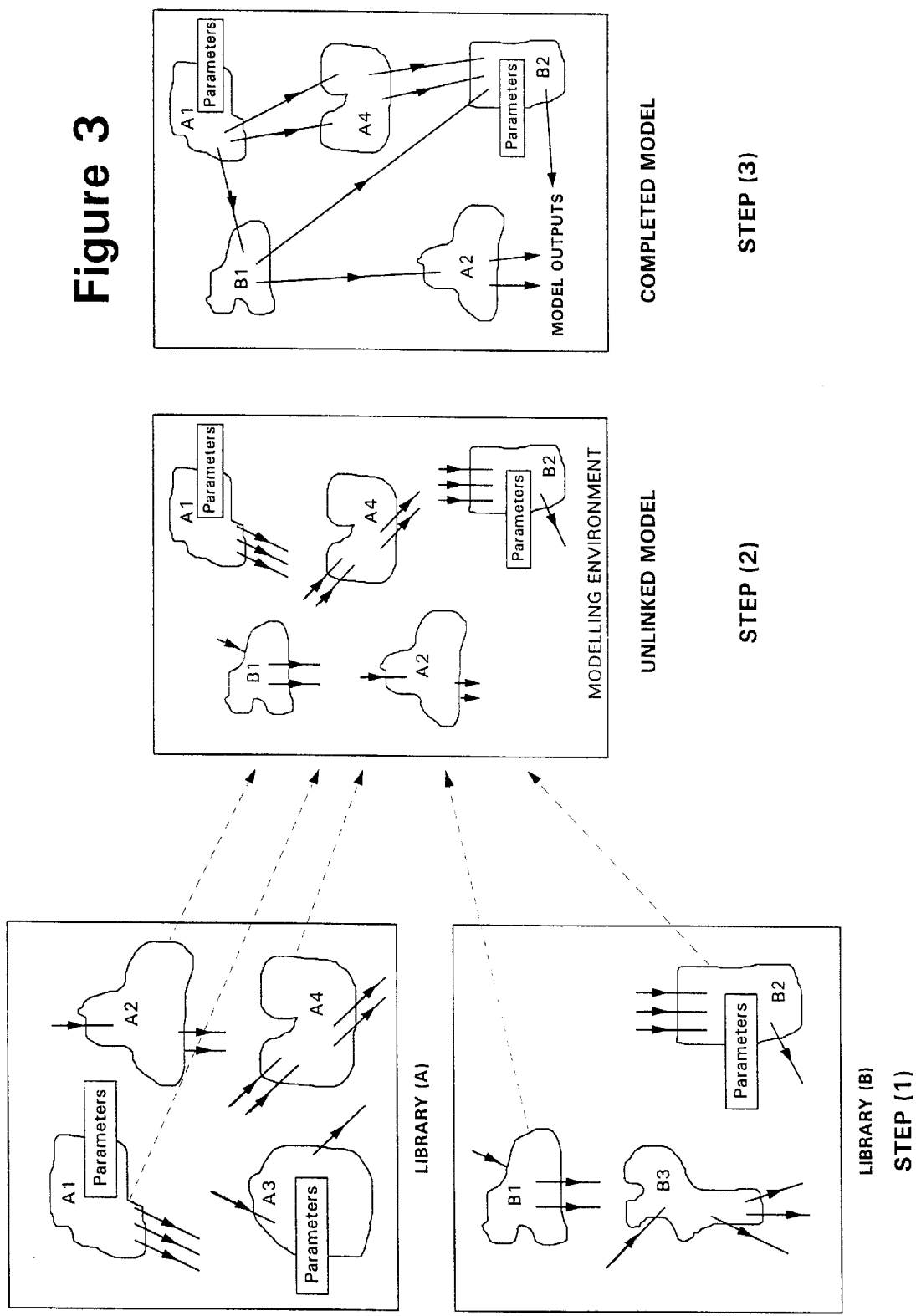

|   | A | B | C | D | D (FORMULAE) |
|---|---|---|---|---|---|
| 1 | CORE EQUIP | V0.1 | Multiplexer | | |
| 2 | Ports | i | Customer_Circuits | 200 | =INDIRECT($C2) |
| 3 | Sites | i | Customer_Sites | 12 | =INDIRECT($C3) |
| 4 | Ports / Mutiplexer | p | 10 | 10 | =C4 |
| 5 | Auto-Utilisation | p | 1.5 | 1.5 | =C5 |
| 6 | Sites Mutiplier | p | 1 | 1 | =C6 |
| 7 | Extra Port Utilisation | w | | 81 | =CEILING((D4-1)/2*D3*D5*D6,1) |
| 8 | Quantity | o | Multiplexer_Quantity | 29 | =CEILING((D2+D7)/D4,1) |
| 9 | Ports | o | Multiplexer_Ports | 200 | =D2 |
| 10 | Sites | o | Multiplexer_Sites | 12 | =D3*D6 |
| 11 | CORE CABLE | V0.1 | Cable | | |
| 12 | Ports | i | Multiplexer_Quantity | 29 | =INDIRECT($C12) |
| 13 | Sites | i | Multiplexer_Sites | 12 | =INDIRECT($C13) |
| 14 | Ports / Cable | p | 8 | 8 | =C14 |
| 15 | Min. Cables / Site | p | 1 | 1 | =C15 |
| 16 | Length | p | 1000 | 1000 | =C16 |
| 17 | Sites Mutiplier | p | 0.25 | 0.25 | =C17 |
| 18 | Quantity | o | Cable_Quantity | 4 | =MAX(CEILING(D12/D14,1), CEILING(D13*D15*D17,1)) |
| 19 | Length | o | Cable_Length | 4000 | =D16*D18 |
| 20 | Ports | o | Cable_Ports | 29 | =D12 |
| 21 | Sites | o | Cable_Sites | 3 | =D13*D17 |
| 22 | COST TOTAL | V0.0 | Multiplexer | | |
| 23 | Multiplexer Cost Total | t | | | |
| 24 | Quantity | i | Multiplexer_Quantity | 29 | =INDIRECT($C24) |
| 25 | Capital / Multiplexer | p | £1,800 | £1,800 | =C25 |
| 26 | Installation / Multiplexer | p | £420 | £420 | =C26 |
| 27 | Capital | o1 | Multiplexer_Capital | £52,200 | =D24*D25 |
| 28 | Install | o2 | Multiplexer_Install | £12,180 | =D24*D26 |
| 29 | Total | o3 | Multiplexer_Total | £64,380 | =SUM(D27:D28) |
| 30 | COST TOTAL | V0.0 | Cable | | |
| 31 | Cable Cost Total | t | | | |
| 32 | Quantity | i | Cable_Quantity | 4 | =INDIRECT($C32) |
| 33 | Capital / Cable | p | £3,200 | £3,200 | =C33 |
| 34 | Installation / Cable | p | £7,700 | £7,700 | =C34 |
| 35 | Capital | o1 | Cable_Capital | £12,800 | =D32*D33 |
| 36 | Install | o2 | Cable_Install | £30,800 | =D32*D34 |
| 37 | Total | o3 | Cable_Total | £43,600 | =SUM(D35:D36) |

Figure 4

DATA MODEL COMPILER SELECTIVELY USING A REFERENCE STORE OF LABELLED PROGRAM COMPONENTS WITHIN A COMMON CLASS

BACKGROUND OF THE INVENTION

1. Field of the Invention

This invention relates to data modelling and finds particular application in the compilation of data models.

2. Related Art

In modelling an aspect of a particular field in data, a data modelling application typically requires a modelling environment in which a predetermined data manipulation component may be constructed with the purpose of operating on variable input data to produce a data output. A complex data model may comprise many levels of data manipulation, combining data from different levels of input, internal and external, in a web of linkage and calculation, possibly interfacing to other data models.

Data modelling applications may often be satisfactorily implemented using personal computers running proprietary spreadsheet products. Data models may be created in spreadsheet form either as stand-alone models or within a client server architecture operating over a network in which models may be created and used in a shared environment.

Proprietary spreadsheet and other data modelling products support a number of basic features to enable data models of varying size and complexity to be assembled. They provide a highly flexible means of model construction, but the process can be very time consuming and error-prone, without a very comprehensive design to work from. Sometimes a model is called for to provide rough cost estimates, for example; something that can be put together rapidly, perhaps building on past experience or relying on proven assumptions to yield a reliable result. Information on the requirements or assumptions for a data model may be initially sketchy or the accuracy of information on which a model is to be initially based is only within broad tolerances. To build up even a top level model using only the basic facilities of a generally available spreadsheet product may take too long to be useful.

It has been observed that different data modelling applications often use similar blocks of formulae. Even complex data models will often replicate a relatively small number of similar formulae to manipulate data, but corresponding economies in time and effort of construction and in susceptibility to error are often difficult to achieve in practice.

SUMMARY OF THE INVENTION

According to the invention there is provided a computer system comprising data processing means connected to:

memory means having a control program stored therein;
a store;
an input interface;
an output interface; and
a reference store containing a plurality of pre-defined program components each having a plurality of fields, wherein each component has a field containing a label unique to that component and wherein at least one component has a field containing information defining a computation to be performed;

wherein the data processing means are arranged, in operation, under control of said control program:

(a) in response to user selection via the input interface to copy selected ones of said program components into the store;

(b) in response to user commands via the input interface to enter into the store link information determining the transfer of data from a field of one program component stored in the store into a field of another such component;

(c) to perform computation as defined by the program components and link information stored in the store and to output results thereof via the output interface;

(d) in response to the label field of a program component stored in the store, to compare a field of the component with a corresponding field of the program component stored in the reference store and having the same label, and to identify a field shown by said comparison to be different.

The invention seeks to verify a particular type of data model with respect to a reference, the data model preferably having being constructed using a particular type of component part, known for the purposes of this invention as a "piece", and a particular method of model assembly from such "pieces".

A piece typically comprises inputs, outputs and pre-defined formulae and is intended to model only one type of entity likely to arise in a particular modelling application. A range of pre-defined pieces, designed and constructed to model a range of associated entities, may be used as the basis for a method of model assembly supporting a wide range of data modelling applications.

Preferably a reference library of pre-defined pieces is assembled to support particular data modelling requirements. A library may contain pieces modelling both generally useful entities and more specialised entities such that data modelling at different levels of detail may be achieved by copying and linking pre-defined pieces from the reference library. The library is intended to provide a single controlled source of pieces to ensure consistency in modelling assumptions and parameters and greater integration of modelling activities across common areas of application. It is intended that a formula or assumption in a model may be traced back to a single corresponding master copy in the library, and that it is clear whether or not the master formulae and assumptions in the library have been updated or otherwise altered since the model was created.

The invention seeks to provide a means to automatically compare particular fields of pieces contained within a data model with corresponding reference versions of those pieces stored in a library. The comparison function highlights those fields compared and found to differ from the reference versions. Such an comparison facility is likely to be of particular value in relation to large and complex data models in which changes or accidental damage to formulae or key parameters in particular fields can be very difficult to identify, even with a highly structured model building approach as described herein.

Preferably, means are included to automatically update a particular field in a data model, as required, with the contents of the corresponding field of the reference version of the piece in the library, depending upon the result of the comparison.

Particular benefit has been derived from the comparison of those fields of a model piece containing formulae with the corresponding reference versions of those formulae in the library piece. Parameter data held in a model piece may also be verified with respect to the corresponding reference piece.

BRIEF DESCRIPTION OF THE DRAWINGS

Specific embodiments of the invention will now be described, by way of example only, with reference to the accompanying drawings in which:

FIG. 1 shows the structure of a basic model building block—a model "Piece"—forming the basis of a preferred method of data model assembly;

FIG. 3 is a pictorial representation of the preferred method of data model assembly;

FIG. 4 shows an example of a section of a model with pieces of the preferred structure linked together using row naming, according to the preferred method;

DETAILED DESCRIPTION OF EXEMPLARY EMBODIMENTS

Figure 2:
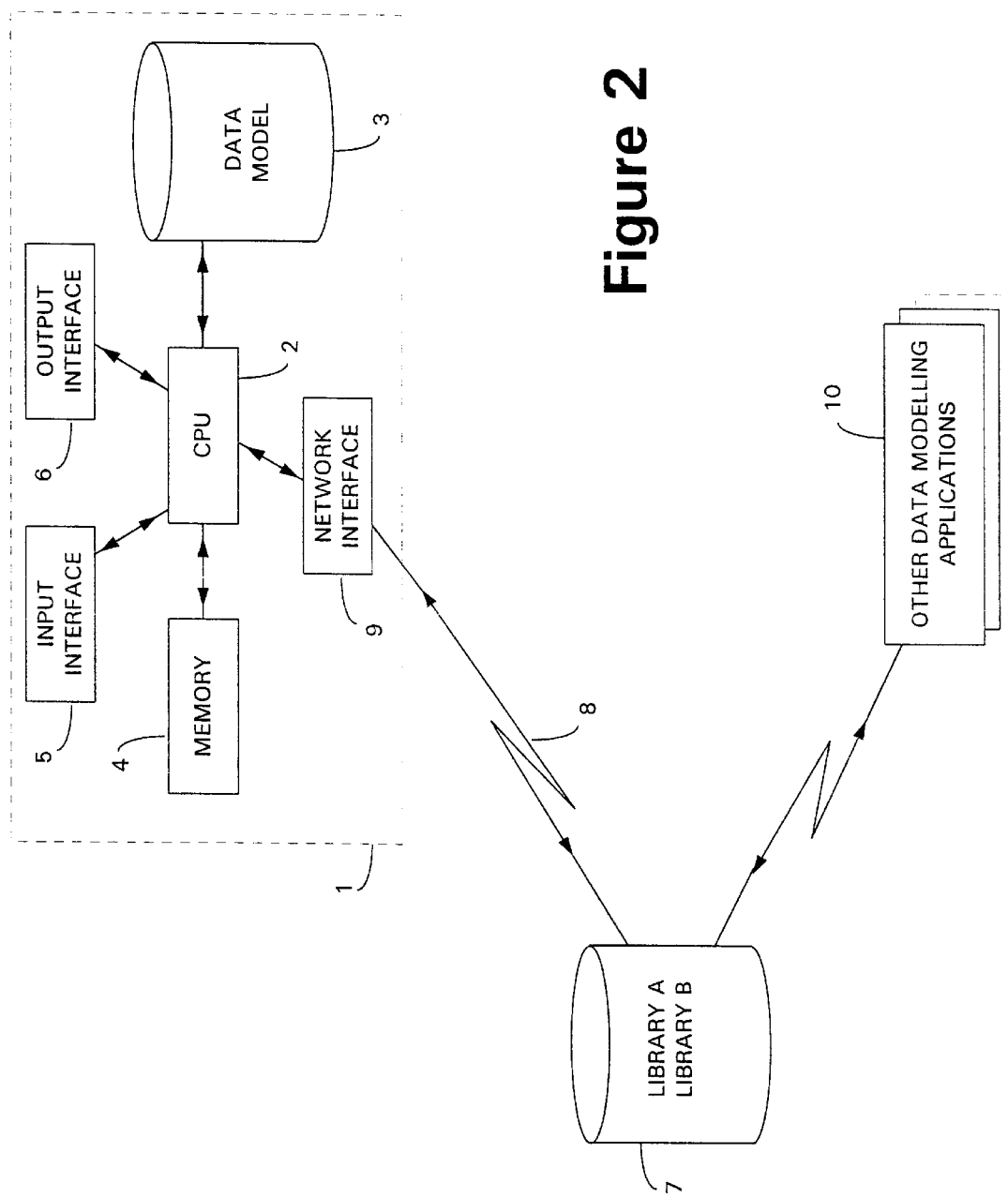
FIG. 2 shows a typical computer system employed in a data modelling application, adapted to apply the preferred method of data model assembly.

A preferred method of data model assembly will first be described, forming as it does a basis for the operation of the invention according to a preferred aspect. There will then follow a more detailed description of the implementation of some preferred embodiments of the invention.

The particular method of data model assembly to be described herein makes use of a basic data model building block, known for the purposes of this invention as a "piece", having a particular structure and existing in a variety of different types, and a computer system adapted to create, store and manipulate pieces, according to the method, to assemble data models. A piece may be designed to perform one of a variety of operations within a data model. However, each type of piece is intended to model only one type of entity likely to arise in a particular range of modelling applications.

In outline, data models are constructed according to the method by assembling pre-prepared pieces in a modelling environment and linking them together so that they interact and operate collectively as a data model.

FIG. 1 shows the preferred structure of a piece in which a row-oriented structure has been chosen to illustrate the principle features of a piece, although other structures are clearly possible. A row-oriented structure is particularly suited to a spreadsheet implementation of the method, as will be described later in relation to a preferred embodiment of the invention. Particular columns have a consistent use throughout the pieces of a model: for example, the piece illustrated in FIG. 1 uses two columns, D and E, to hold and manipulate data within the piece. Further columns may be added to pieces within a model, beyond column E for example, to accommodate further data. Preferably, data are passed vertically between pieces within a model via the data columns.

In the structure of FIG. 1, the first row of a piece is dedicated to the recording of certain "control" information for the piece, preferably comprising at least a unique identifier for the piece in the first field of the row, usually chosen to be a name descriptive of the function of the piece. The second field of the first row is available to record a version number for the piece and the third field is available to record a specific name for the piece, used, in particular, to indicate the type of data being output by the piece. A specific piece name entered into the third field serves to further distinguish the piece in the event that the piece is replicated in the model with each copy retaining the same piece identifier, though being used in respect of different data.

The second and each subsequent row of a piece may be of one of the following types:

a) an Input row, able to be linked to an output row of another piece elsewhere in a model;

b) a Parameter row;

c) an optional Workspace row for intermediate calculations;

d) an Output row comprising the main formulae of the piece; or e) a Comment row having no effect on the operation of the piece.

Preferably, the type of each of the second and any subsequent rows is identified by a character recorded in the second field—column B—of that row. In the preferred structure of FIG. 1 an "i" is used to identify an input row, a "p" for a parameter row, a "w" for a workspace row and an "o" for an output row. An optional comment row may be identified by a "t", for example.

An input row, designated "i" in column B, may be used to define a type of data to be input to the piece. An input row preferably comprises a controlling cell, column C in the structure shown in FIG. 1, in which may be recorded the identity of a location elsewhere in the model from which data may be obtained for use as input to that row of the piece.

A parameter row, designated "p" in column B, may be used to record, in column D onwards, parameters (i.e. fixed values) for use either within the piece itself, or for supply to other pieces within a model. Parameter data may embody assumptions or factual data appropriate to the entity being modelled, or to the data modelling application as a whole. For example, parameter data may define minimum ordering quantities for an item, or unit costs.

A workspace row, designated "w" in column B, may be used to perform intermediate calculations within a piece combining, for example, input data with parameter data to obtain a result intermediate to that finally output by the piece.

An output row, designated "o" in column B, preferably comprises the main formulae of the piece, manipulating data held within the piece as a result of data input, parameter data or the results of intermediate calculations. The results of formulae appearing in particular fields of an output row may be used either by other pieces within a model or as output of the model itself. In the latter case, a further series of row type designations, "o1", "o2", "o3" and so on, may be used to indicate than an output row represents a final output of the model. An output row includes a unique identifier, preferably recorded in column C, which may be used as a reference by other pieces to identify the location of particular data outputs of the row so that such outputs may be used for data input elsewhere in the model.

A comment row, designated "t" in column B, has no effect on the function of a piece. A comment row may be used to document a piece and may be of particular use in describing the function of a piece in some detail.

A particular piece may comprise one of many possible combinations of inputs, outputs, parameters and formulae and be designed to perform one of a variety of different operations within a data model. However, as each type of piece is intended to model only one type of entity likely to arise in a particular range of modelling applications, each type of piece must be uniquely identifiable, preferably by means of the unique piece identifier recorded in the first field of the first row.

At the very least, to be of use, a piece must include a unique identifier and at least one output.

Preferably, a range of different basic piece types are first designed and constructed, with the intention of modelling as many of the entities likely to be required to assemble data models relating to a particular area of application as possible, and collected together to form one or more reference libraries of master versions of the pieces appropriate to that area. For example, the simplest piece types may act only as sources of parameter data for a model, outputting unit costs, for example, for use by other pieces; the latest costs would be maintained in the master version of such pieces in a library. Other pieces may combine inputs with other parameters to yield new results, modelling more complex entities.

In a particular example, a collection of pieces has been designed and constructed using spreadsheets to model entities likely to be required to predict costs for provision of parts of a telecommunications network. A master copy of each piece is held in a library spreadsheet dedicated to network provision cost modelling. Any user with a need to model the likely costs of providing a network may copy appropriate pieces from the library spreadsheet and assemble them in a model spreadsheet, linking pieces together to form a data model. For this example, pieces may be included in a library to model the following entities:

Circuit Demand
64 kbit/s Circuit Equivalents
Transmission Equipment Requirements
Cabling Requirements
Underground Duct Requirements
Unit Costs For Underground Duct
Cost Of Duct Provision
Unit Costs For Cable
Cost Of Cable Provision
Equipment Unit Costs
Total Equipment Cost
Assumptions On Overheads
Grand Totalling Referring to FIG. 2, an example of a computer system 1 is shown comprising a central processing unit (CPU) 2 adapted to assemble data models and to store them in a 'local' store 3 under the control of a program residing in memory 4, user input to the program being provided via an input interface 5, preferably using a keyboard and mouse, output of the program being signalled via an output interface 6, preferably displayed to a user on a visual display unit (VDU) or printer. One or more libraries, A and B, holding master copies of pieces designed to form the basis of data models created by the computer system 1 are shown separately stored in a reference store 7, accessible by the computer 1 via a network 8 and a network interface 9. Other related data modelling applications 10 may copy pieces from the reference store 7 in a similar way to computer system 1.

A library is intended to provide a single controlled source of pieces to ensure consistency in modelling assumptions and parameters and greater integration of modelling activities across common areas of application. It is intended that a formula or assumption used in a model may be traced back to a single corresponding master copy in the library, and that it is clear whether or not the master formula or assumption in the library has been updated or otherwise altered since the model was created.

Referring to FIG. 3, the preferred method of assembly of a data model from library pieces is illustrated pictorially, comprising three main steps:

(1) Identify the pieces likely to be required for the model from those available in a library;
(2) Copy the identified pieces from the library into a 'local' modelling environment;
(3) Link the pieces together as required within the model environment, inputs of a piece being linked to outputs of other pieces, to form a working data model.

At Step (1) in FIG. 3, the example shown begins with two reference libraries, A and B, of unlinked pieces. A selection of pieces are copied into a modelling environment resulting, at Step (2), in an assembly of unlinked pieces. At Step (3) the required links are established so that the pieces may interchange data and perform as a data model with appropriate model outputs.

Links are established between pieces after they have been copied into a model environment, the master versions being unlinked. The modelling environment provided by a data modelling computer 1 is required to provide a mechanism by which pieces may be linked. For example, any form of addressing which enables data to be passed automatically from one addressed location in a model to another would suffice.

Referring once again to the piece structure of FIG. 1, a preferred method of linking pieces together makes use of the unique name recorded in column C of each output row. The unique name identifies the row uniquely within a data model. Where it is required to use data output by a particular output row of a piece as the data input to another piece, the unique name assigned to that output row may be used in the other piece to identify the location from which the input data are to be taken. Preferably, column C of an input row is chosen as a controlling field for the input row so that by writing the unique name of an output row into the controlling field, data appearing as a result of a data manipulation in a particular data column position (column D onwards) in the named output row are then available as input to the corresponding column position of the input row. The facility of passing data from a row addressed by name is an inherent feature of a preferred modelling environment and is generally available, in particular, with spreadsheet products.

Referring to FIG. 4, an example of a section of a data model is shown comprising four pieces modelling entities in the field of telecommunications network provision. In the specific example of FIG. 4, column D is shown in two forms: firstly, showing the data resulting from calculations performed by underlying formulae, data copied from referenced fields or data held as fixed parameters; secondly, showing the underlying formulae, references or fixed parameters themselves. The first piece, "CORE_EQUIP", is of a type modelling communications equipment requirements. In this example it is modelling the requirements for Multiplexer equipment as indicated by the assignment of "Multiplexer" as the specific name for the piece in the third field (column C) of the first row. There are three output rows of the piece, identified by an "o" in column B and by unique names recorded in column C of each output row, the output data appearing in a data column, column D. The piece has two input rows, identified by an "i" in column B, relating to "Ports" and "Sites". The input rows take their input data in column D from two indirectly referenced data output rows elsewhere in the model, not depicted in the portion shown in FIG. 4, as identified in column C of the input rows as "Customer_Circuits" and "Customer_Sites" respectively. The piece also includes three parameter data rows, identified by a "p" in column B, supplying data for use within the piece, in particular for use by an intermediate workspace row identified by a "w" in column B.

The second piece, "CORE_CABLE", is of a type modelling cable requirements. It takes as its input two of the outputs of the "CORE_EQUIP" piece, identified respectively by their names "Multiplexer_Quantity" and "Multiplexer_Sites" in column C, the result of the calculations of those referenced output rows being copied to column D of the input rows of "CORE_CABLE".

The third and fourth pieces are replicas of a final costing piece, "COST_TOTAL", calculating capital and installation costs for Multiplexer equipment and Cables. The two copies of the "COST_TOTAL" piece are distinguished by the use of different specific piece names in column C of the first row of each piece, "Multiplexer" and "Cable" respectively. Each "COST-TOTAL" piece includes parameter data specific to the items being costed; in this example the parameter data has been entered into the piece once within the model environment rather than the parameters pre-existing in the master copy of "COST_TOTAL" in a library.

The outputs of the "COST_TOTAL" pieces are recognised as outputs of the model as a whole, being identified by "o1, o2, o3, etc" in column B.

The piece structure of FIG. 1 may be adapted to generate a unique name for an output row automatically within a piece once the piece has been copied into a model from a library. The unique name may be formed from two parts. The specific piece name recorded in column C of row 1 of the piece may be used as the first part of the name. To this part may be automatically appended a predetermined identifier, preferably recorded in column A of the output row, descriptive of the type of data being output by the row. If the specific piece name assigned is unique among those copies of the same master piece in a model, then the combination of the two parts forms a unique name for each output row in the model. FIG. 4 shows this mechanism in use for the output rows. For example, in the "CORE_CABLE" piece, the output row identifier recorded in column C of each output row, rows 18–20, is formed automatically from the specific piece name "Cable" in column C of row 1 and the name in column A of the output row, for example "Length" in row 19, the two parts together forming the unique output row name "Cable_Length" in column C.

It may be useful to include pieces within a library modelling entities at a higher level, for example an entire subsystem, incorporating certain assumptions which may need to be made when carrying out a rough estimation exercise. A piece modelling such an entity may be assembled from other lower level pieces to form a "compound" piece. Assumptions made at the time of constructing the master version of a compound piece may themselves be continually updated in the master library version so that new and existing modelling applications may use the very latest information pertinent to that entity.

Preferably, every model includes a piece providing control information for the model as a whole. In particular, a control piece specifies the version number of the model and the identity, location and version of the library or libraries from which pieces were copied in assembling the model. Such a piece may also define the width of the model, that is, the number of data columns in the model.

The method may be implemented to create data models, employing pieces as described, using a conventional personal computer system such as that illustrated in FIG. 2, onto which has been installed a conventional spreadsheet product such as Microsoft's EXCEL Version 5.0. Referring to FIG. 2, a computer system 1 with access to data storage devices 7 and 3, for libraries and 'locally' created spreadsheets respectively, and the facilities provided by the spreadsheet product itself, residing in memory 4 and controlling the CPU 2, provides a suitable modelling environment both for the initial creation of master pieces and for their subsequent assembly into data models. For example, spreadsheet files may be created to hold master copies of pieces and stored in a reference storage device 7 in the form of libraries A and B. The preferred piece structure of FIG. 1 and the method of linking pieces illustrated in FIG. 3 and the example of FIG. 4, may be implemented directly in a spreadsheet model environment.

The naming facility in EXCEL Version 5.0, for example, provides a means to assign a name to a particular row in a spreadsheet and to pass data from cells within that row to other rows by simply referencing the row name. If required, individual spreadsheet cells may be individually name d and referenced elsewhere in a model spreadsheet without adhering to a strict column structure. However, the regularity of structure provided by the method described above brings the advantage of simplicity to modelling applications which is likely to be undermined by a departure from a convention of consistent column use throughout a model.

A Visual Basic macro may be conveniently provided to automatically select and copy pieces from a specified library spreadsheet into a model spreadsheet. Initially, a list of model piece identifiers and associated piece names is entered manually into the model spreadsheet to identify the library pieces required, the list being headed by an identifier for a control piece referencing the library or libraries to be used and specifying the number of data columns required in the model. The macro is then run to automatically copy into the model each of the pieces identified in the list, from the latest master version in the referenced library, adding the specified piece names and creating the output row names of each piece. The macro adds the specified number of data columns to the rows of each piece and replicates any pre-determined formulae from the master piece across the data columns. To end, the macro writes version control information into the control piece of the model.

Further named pieces m ay be added into a model at any time by writing in the required piece identifier and a piece name at the required location in the model and running the macro. If a new piece is to be obtained from a library not already referenced in the model, a control piece must also be named, specifying the new library reference, before running the macro.

Specific embodiments of the invention will now be described in more detail, by way of example only, with each embodiment operating on a spreadsheet-based implementation of the data model assembly method described above, specifically using a Microsoft EXCEL.

The invention, in a preferred aspect, provides a means to automatically compare particular fields in pieces of a model with corresponding fields in master versions of pieces in a library of pieces from which they were copied. The comparison means may be operated at any time to compare particular fields in pieces of a model with the latest versions of corresponding master pieces in a library and to highlight differences.

The comparison means is preferably implemented using a Visual Basic program installed on a computer system 1 in memory 4 such that the computer system 1 is adapted to provide, in addition to its model assembly capability, a comparison facility in which pieces of a data model stored in store 3 are compared with corresponding master versions of those pieces in a library or libraries, A and/or B, in a reference store 7 and the results of the comparison signalled via an output interface 6, for display, for example, on a visual display unit.

Figure 5:
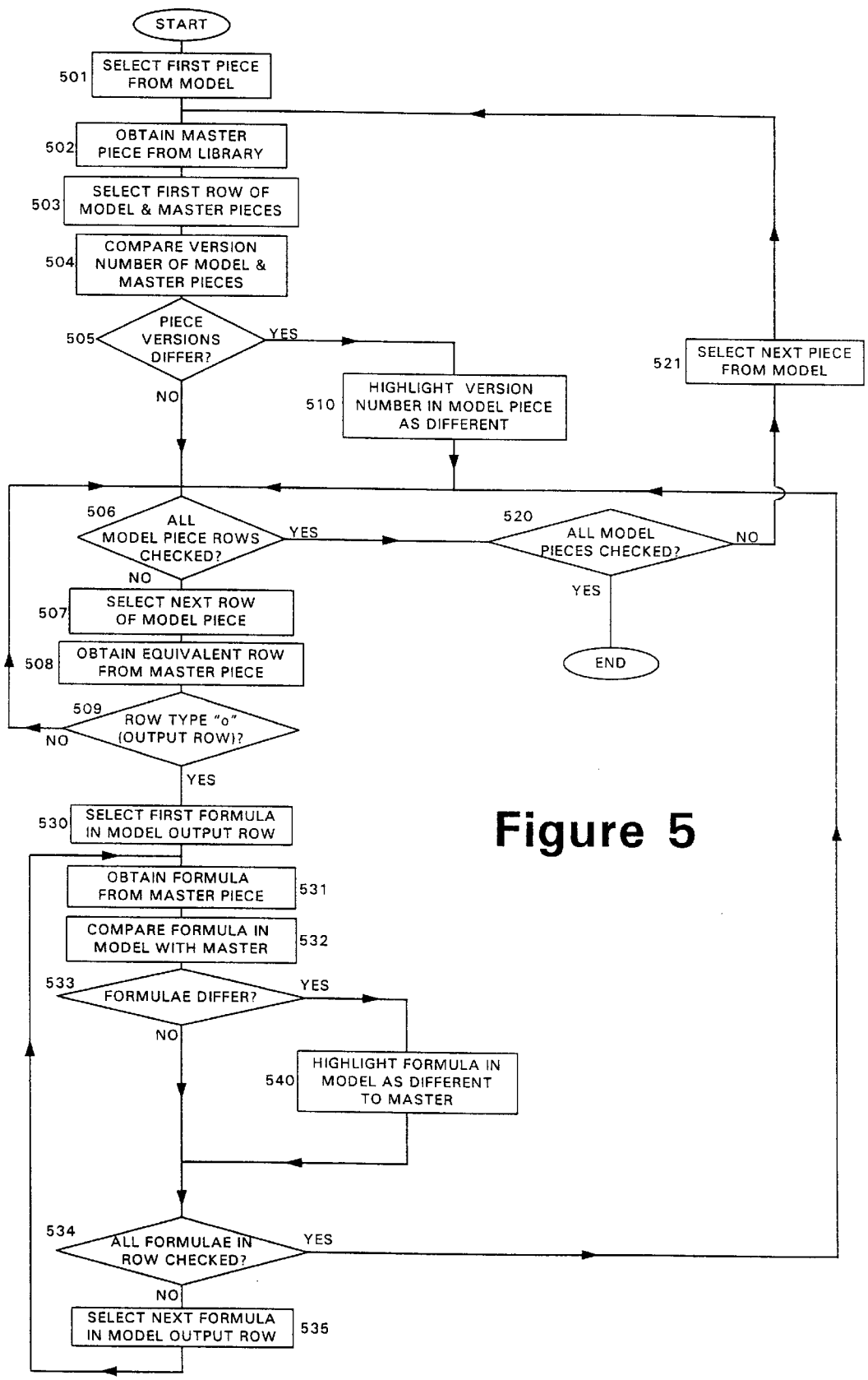
FIG. 5 is a flow diagram representing the operation of a formula comparison macro according to a preferred embodiment of the invention.

Referring to FIG. 5, a flow diagram is provided showing the working of a comparison macro according to a preferred embodiment the invention. To begin, the macro selects, at step 501, the first piece in a data model to be checked and obtains, at 502, the corresponding master of the selected piece from a known library from which the piece was originally copied. The first row of each of the model and master pieces is selected at 503 and a comparison made at 504 and 505 between version numbers stored in the respective fields at column position B. If a difference in piece version numbers is found, the model piece version number field is highlighted, at 510, to indicate to a user that updates may have been made to the master version of the piece since it was copied into the model. If any rows of the piece remain to be compared, at 506, the macro steps onto the next row of the model piece at 507 and, selecting the equivalent row from the master piece at 508, the macro steps through the model piece, row by row, looping through steps 506 to 509, until an output row is found, at 509, identified by a "o" in the row type identifier field recorded in column B of the row. The main formulae of a piece are recorded, in particular, in data column positions D onwards of an output row. On selecting an output row, the macro selects from the row, at 530, the first field containing a formula, usually the field at column position D, and compares it with the equivalent formula obtained from the master piece, at steps 531 to 533. If the formulae differ, the model formula is highlighted, at 540, preferably displaying the result on a visual display unit via output interface 6 to indicate a difference. The comparison is repeated for each formula in the selected output row, through steps 531 to 535, until all formulae in the output row have been compared, whereupon (534) the macro returns to step 506 onwards to continue the comparison for any remaining output rows of the piece. On reaching the end of a piece at 506, the next piece is selected at 521, if the end of the model has not been reached at 520, and the comparison continues as for the first piece. The comparison ends when step 520 establishes that all model pieces have been compared with their library masters.

This process may of course be modified to include the checking of formulae in "w" type rows.

Figure 6:
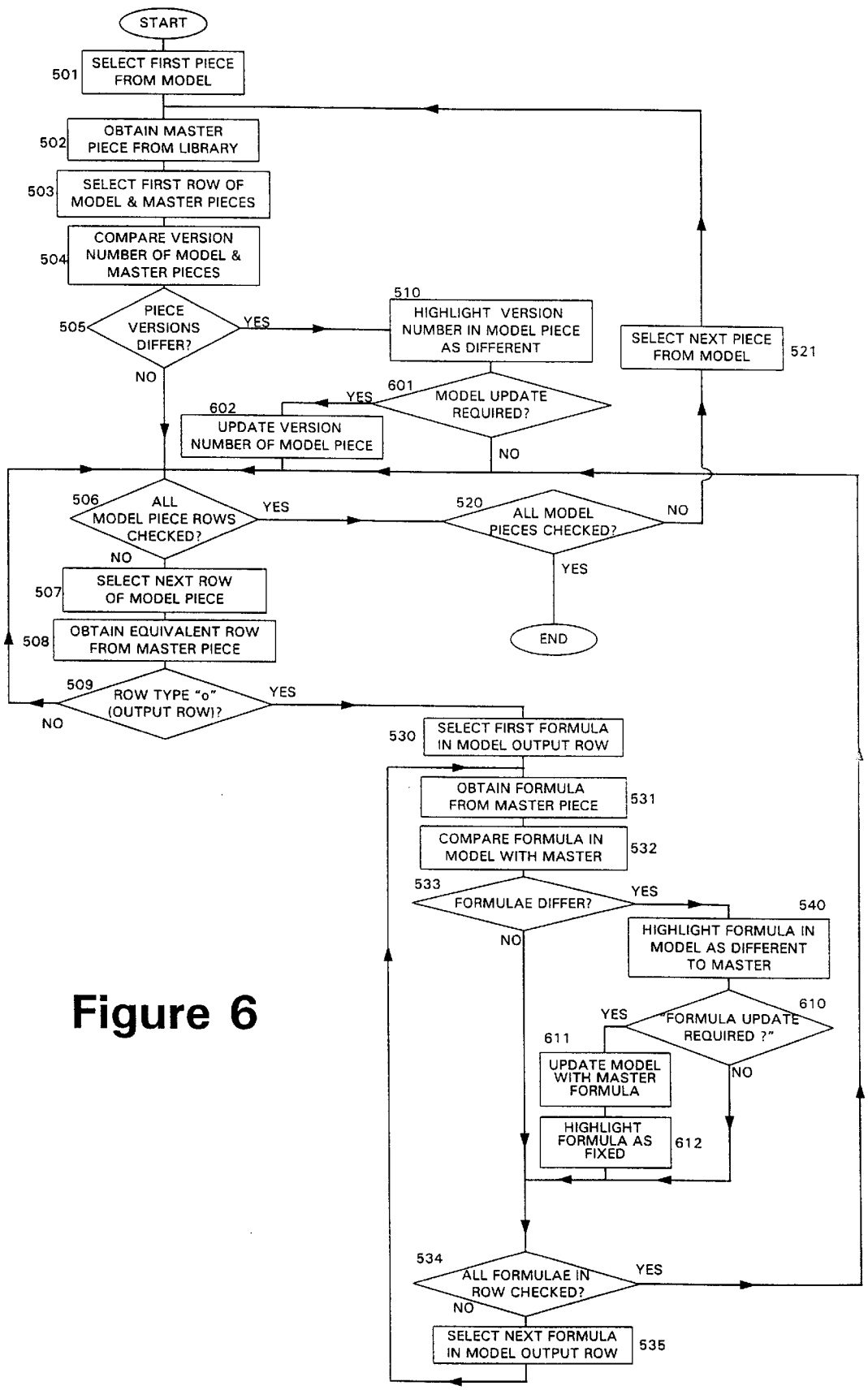
FIG. 6 is a flow diagram representing the operation of a formula comparison macro including an update facility according to a further preferred embodiment.

In another embodiment of the invention, means are provided to automatically update a model in the event that differences are found by the comparison of formulae in model pieces with master pieces. FIG. 6 is a flow diagram showing all the steps of FIG. 5, along with the additional steps required to perform an update of formulae in output rows of a model piece, where they are found to differ from the corresponding formulae in the master piece, and to update the version number recorded in the first row of a model piece where it is found to differ. Where a formula is found to differ from that in the corresponding master piece at step 533, the formula field is highlighted at 540, preferably by means of a signal sent via output interface 6 to a visual display to change the colour of the displayed field to indicate a difference, whereupon step 610 establishes whether or not the formula in the model is to be updated, preferably prompting the user to signal a preference via the input interface 5. It may be that a deliberate change was made to the formula in the model and a user may decide that it should remain as amended. If update is required at 610, then the formula in the model is replaced or updated with the master formula, at 611, and the model formula field is highlighted, at 612, to indicate that the formula has been updated, preferably by means of a further signal output via the output interface 6 to the visual display unit to display a different colour or shading to that used at step 540. The macro then proceeds to check any remaining formulae in the output row or in subsequent rows and pieces.

Figure 7:
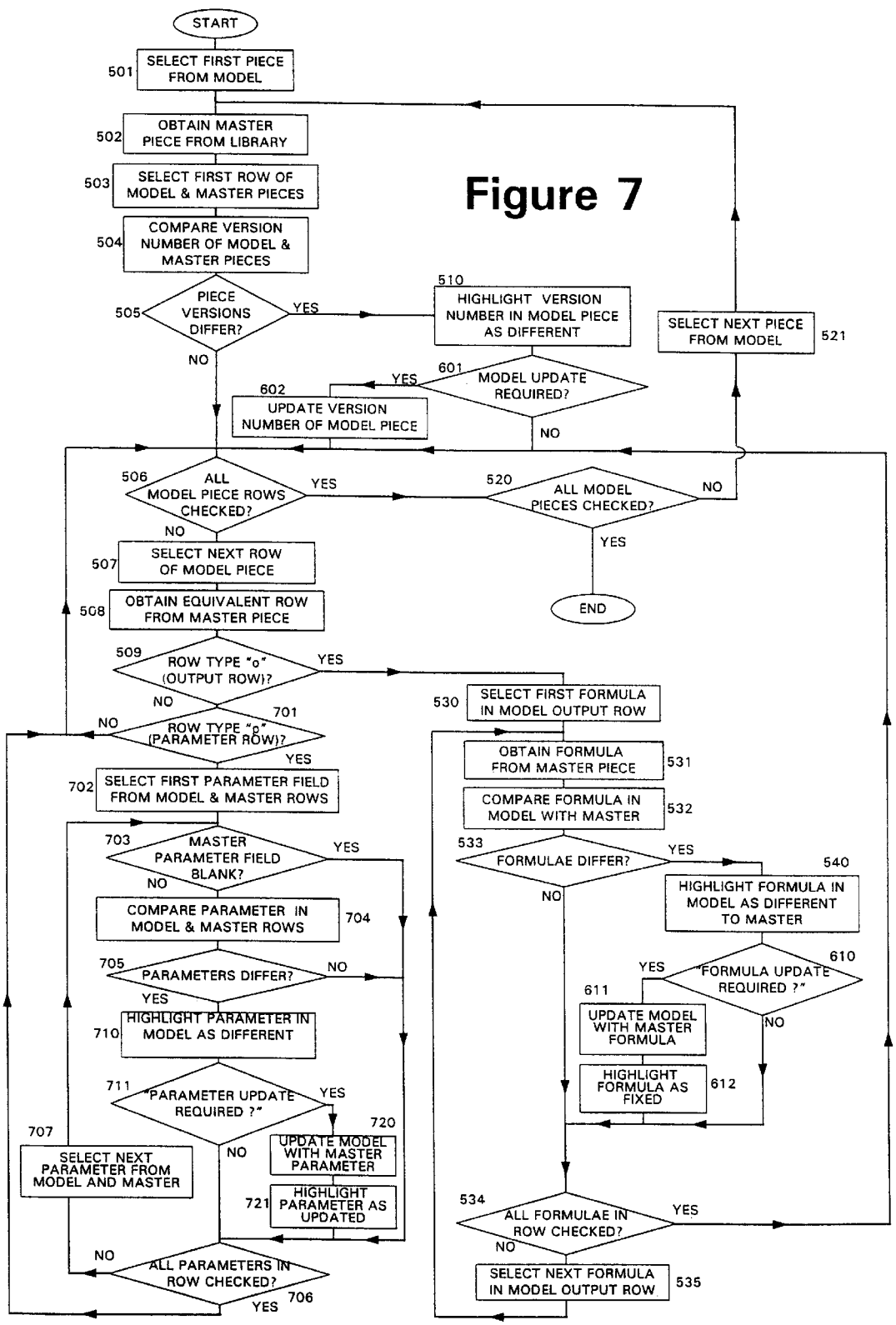
FIG. 7 is a flow diagram representing the operation of a macro including parameter comparison and update means according to another embodiment of the invention.

In yet another embodiment of the invention, the comparison macro may be adapted to compare, additionally, a parameter data row in a model piece with a corresponding parameter row in the master piece. Such a facility may be particularly useful in updating unit cost data held in a model, for example, where the latest data are continually revised in master versions of pieces in the library. FIG. 7 is a flow diagram showing the further steps required to perform parameter row comparison and update. Having established that the currently selected row in a piece is not an output row, at step 509, the macro proceeds to check for a "p" in the column B position of the currently selected row, at 701, indicating that the row is a parameter row. On finding a parameter row, the first parameter field is selected from the model, at 702, as is the corresponding parameter from the master piece. If, at 703, the master parameter is found to be blank, then it is assumed that the parameter value was intended to be user defined and that any entry in the parameter field in the model is assumed to be valid. In that event, the macro continues to check any further parameters in the row via step 706. If the master parameter was not blank at 703, then a comparison is made with the model parameter at 704. If no difference is found, the macro proceeds to check any further parameters, via 706. Where a difference is found, at 705, the parameter field is highlighted at 710, preferably by means of a signal sent via output interface 6 to a visual display to change the colour of the displayed field to indicate a difference. The macro then establishes whether model update is required, at 711, preferably prompting the user to signal a preference via the input interface 5. If the requirement for update is signalled at 711 then the model parameter is replaced by the master parameter in the model row, at 720, and the parameter field highlighted, at 721, to indicate that an update has been made, preferably by means of a further signal output via the output interface 6 to the visual display unit to display a different colour or shading to that used at step 710. The macro then proceeds to check any further parameters in the row, via 706.

Other products may also provide a suitable modelling environment and means to implement macros to assist in the compilation of models and the automatic verification and update of model components, embodying the techniques described herein.

What is claimed is:

1. A computer system comprising:
    data processing means connected to:
        (i) memory means having a control program stored therein;
        (ii) a store;
        (iii) an input interface;
        (iv) an output interface; and
        (v) a reference store containing a plurality of predefined program components each having a plurality of fields, wherein each component has a field containing a label unique to that component and wherein at least one component has a field containing information defining a computation to be performed;
    wherein the data processing means are arranged, in operation, under control of said control program:
        (a) in response to user selection via the input interface to copy selected ones of said program components into the store;

(b) in response to user commands via the input interface to enter into the store link information determining the transfer of data from a field of one program component stored in the store into a field of another such component;

(c) to perform computation as defined by the program components and link information stored in the store and to output results thereof via the output interface; and (d) in response to the label field of a program component stored in the store, to compare a field of the component with a corresponding field of the program component stored in the reference store and having the same label, and to identify a field shown by said comparison to be different;

wherein each component, at least in the reference store, having tag fields each of which identifies a field of the component as being of one of a plurality of classes of field, and wherein the said comparison is performed only for fields thereby indicated as belonging to a particular class or classes.

2. A computer system according to claim 1 in which the data processing means are arranged, in operation, under control of said control program, following said comparison, to output via the output interface a signal identifying a field shown by the comparison to be different.

3. A computer system according to claim 1 in which the data processing means are arranged, in operation, under control of said control program, following said comparison, to update the contents of a field shown by the comparison to be different with the contents of the corresponding field of the pre-defined component stored in the reference store having the same label.

4. A computer system according to claim 2 in which the data processing means are arranged, in operation, under control of said control program, following the output of said signal, to await a confirmation signal from the user via said input interface and only upon receipt thereof to update the contents of a field shown by the comparison to be different with the contents of the corresponding field of the pre-defined component stored in the reference store having the same label.

5. A computer system according to claim 1 in which one such particular class is a class of all those fields which contain information defining a computation to be performed.

6. A computer system according to claim 1 in which one such particular class is a class of all those fields which each contain a constant value for use in a computation defined in the same or another component.

7. A computer system according to claim 1 in which the control program is an electronic spreadsheet program, the pre-defined program components each comprise a portion of an electronic spreadsheet and the or each field which contains information defining a computation to be performed is a spreadsheet field containing a formula.

8. A method of generating a data model on a computer using a plurality of program components selected from a reference store containing a plurality of separated, pre-defined program components, wherein each program component in the reference store has a field containing a label unique to that program component and wherein at least one said program components as a field containing information defining a computation to be performed, the method comprising the steps of:

(i) copying selected ones of said program components from the reference store into a work store;

(ii) entering into selected program components, stored in the working store, link information determining the transfer of data from a field of one program component stored in the working stored to a field of another such component;

(iii) performing computation as defined by the program components and link information stored in the working store and outputting results thereof; and (iv) comparing a field of a program component stored in the working store with the corresponding field of a program component stored in the reference store and having the same label, and identifying a field shown by comparison to be different, wherein a program component includes one or more of a plurality of different types of field, each field type being identified within the program component, at least within the reference store, by the contents of an associated tag field, and wherein said comparing step is performed only in respect of fields of a predetermined type.

9. A method as in claim 8, including the step:

(v) replacing the contents of a field of a program component stored in the working store, identified from step (iv) as being different, with the contents of the corresponding field of the program component stored in the reference store and having the same label.

* * * * *